UNITED STATES PATENT OFFICE 2,205,849

AZO DYESTUFFS SOLUBLE IN WATER

Erich Fischer, Bad Soden in Taunus, and Otto Lang and Arthur Siebert, Frankfort-on-the-Main, Germany, assignors to General Aniline & Film Corporation, a corporation of Delaware No Drawing. Application June 21, 1938, Serial No. 214,936. In Germany June 22, 1937

5 Claims. (Cl. 260—163)

The present invention relates to azo dyestuffs soluble in water; more particularly it relates to dyestuffs corresponding with the following general formula:

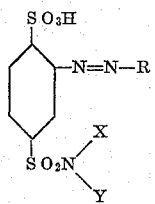

wherein R stands for the radical of an azo component and X and Y stand for hydrogen or the same or different aliphatic, aromatic or aliphatic-aromatic radicals.

We have found that valuable water-soluble azo dyestuffs are obtained by combining with any coupling component a diazo compound from an amine of the general constitution:

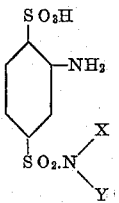

wherein X and Y stand for hydrogen or the same or different aliphatic, aromatic or aliphatic-aromatic radicals. The new dyestuffs yield, especially on wool, dyeings of very good fastness to light. Some of them may also be transformed into color lakes which are very fast to light.

The amines used as diazo components in the present process may be prepared by causing the corresponding 1-chloro-2-nitrobenzene-4-sulfamides to react with sodium sulfite and then reducing the nitro compounds obtained.

The following examples serve to illustrate the invention, but they are not intended to limit it thereto; the parts are by weight:

(1) An aqueous solution obtained from 280 parts of 1-amino-3-sulfonic acid-dimethylamide-benzene-6-sulfonic acid and the equivalent amount of sodium carbonate is mixed with the calculated amount of sodium nitrite and the whole is run into 250 parts by volume of hydrochloric acid of 20° Bé., diluted by means of ice water. The diazo suspension obtained is then combined with a solution of 208.5 parts of 1-(2'-chlorophenyl)-3-methyl-5-pyrazolone made alkaline with sodium carbonate. When the coupling is complete the dyestuff is filtered with suction and dried. It is a yellow powder. The yellow printing lakes obtained therefrom have a very good fastness to light.

(2) The diazo suspension obtained from 280 parts of 1-amino-3-sulfonic acid-dimethylamide-benzene-6-sulfonic acid is coupled, in the presence of sodium acetate, with a solution, neutral to litmus, of 301.5 parts of 1-(2'-chloro-6'-methyl-4'-sulfophenyl)-3-methyl-5-pyrazolone. The dyestuff is worked up as usual; it is a yellow powder which is soluble in water and yields on wool greenish-yellow dyeings of good fastness to light, water and washing. The dyestuff corresponds with the following formula:

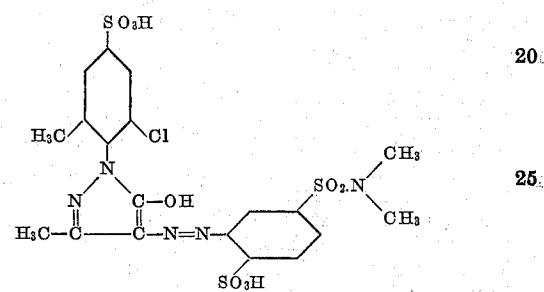

Similar dyestuffs are obtained, if the amine used in this example is, for instance, exchanged for 1-amino-3-sulfonic acid-diethylamide-benzene-6-sulfonic acid or for 1-amino-3-sulfonic acid-anilide-benzene-6-sulfonic acid.

(3) 308 parts of 1-amino-3-sulfonic acid-diethylamide-benzene-6-sulfonic acid are diazotized as usual and, in a manner analogous to that described in Example 1, coupled with 222.5 parts of 1-(2'-chloro-6'-methylphenyl)-3-methyl-5-pyrazolone. The dyestuff is isolated as usual; it is a yellow powder which is readily soluble in water and yields on wool yellow dyeings of very good fastness to light.

If the coupling component indicated in this example is, for instance, exchanged for 1-phenyl-3-methyl-5-pyrazolone,
1-phenyl-5-pyrazolone-3-carboxylic acid ethyl ester or
1-(4'-sulfophenyl)-5-pyrazolone-3-carboxylic acid, dyestuffs having similar properties are obtained.

In the same manner, similar dyestuffs are obtained, if the diazo component used is, for instance, exchanged for one of the following amines:

1-amino-3-sulfonic acid-amide-benzene-6-sulfonic acid,
1-amino-3-sulfonic acid-diphenylamide-benzene-6-sulfonic acid,
1-amino-3-sulfonic acid-benzylamide-benzene-6-sulfonic acid,
1-amino-3-sulfonic acid-methylamide-benzene-6-sulfonic acid,
1-amino-3-sulfonic acid-(4'-chloranilide)-benzene-6-sulfonic acid,
1-amino-3-sulfonic acid-(4'-methylanilide)-benzene-6-sulfonic acid or
1-amino-3-sulfonic acid-(2'-methoxanilide)-benzene-6-sulfonic acid.

(4) 281 parts of 2-acetylamino-5-hydroxynaphthalene-7-sulfonic acid are dissolved, in the form of the sodium salt, in water and an excess of sodium acetate is added. A diazo-suspension obtained from 280 parts of 1-amino-3-sulfonic acid-dimethylamide-benzene-6-sulfonic acid is then added to the solution. When the coupling is complete, the dyestuff is separated as usual, filtered with suction and dried. It is a red powder which is soluble in water and dyes wool an even orange tint, fast to light.

Similar dyestuffs are obtained, if 2-benzoyl-amino-5-hydroxynaphthalene-7-sulfonic acid is used.

(5) If, in Example 4, the 2-acetylamino-5-hydroxynaphthalene-7-sulfonic acid is exchanged for 223 parts of 2-amino-naphthalene-7-sulfonic acid, a dyestuff is obtained which dyes wool a yellowish-red tint of very good fastness to light.

(6) 280 parts of 1-amino-3-sulfonic acid-dimethylamide-benzene-6-sulfonic acid are diazotized and coupled, in a solution feebly acid to Congo paper, with 239 parts of 2-amino-8-hydroxynaphthalene-6-sulfonic acid. When the coupling is complete, the dyestuff is isolated in the usual way. It is a red powder which is soluble in water and dyes wool red tints of very good fastness to light.

A similar dyestuff is obtained, if the amine used in this example is exchanged for 1-amino-3-sulfonic acid-N-methylanilide-benzene-6-sulfonic acid.

If the coupling components indicated in Examples 4 to 6 are, for instance, exchanged for one of the following compounds:

1-acetylamino-8-hydroxynaphthalene-4-sulfonic acid
or
1-benzenesulfamino-8-hydroxynaphthalene-3.6-disulfonic acid, dyestuffs having similar properties are obtained.

We claim:
1. The water-soluble azo dyestuffs of the following general formula:

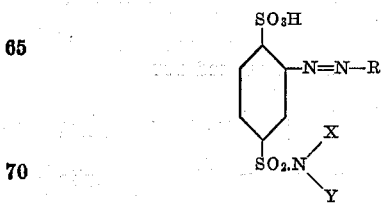

wherein R stands for a radical of the group consisting of pyrazolones, amino-naphthalene sulfonic acids, amino-naphthol sulfonic acids and acylamino-naphthol sulfonic acids, and X and Y stand for members of the group consisting of hydrogen, alkyl, benzyl and radicals of the benzene series, being yellow to red powders which yield on wool dyeings of good fastness to light and may be transformed into color lakes of good fastness properties.

2. The water-soluble azo dyestuffs of the following general formula:

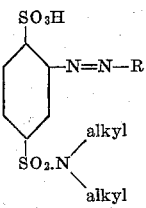

wherein R stands for a radical of the group consisting of pyrazolones, amino-naphthalene sulfonic acids, amino-naphthol sulfonic acids and acylamino-naphthol sulfonic acids, being yellow to red powders which yield on wool dyeings of good fastness to light and may be transformed into color lakes of god fastness properties.

3. The water-soluble azo dyestuff of the following formula:

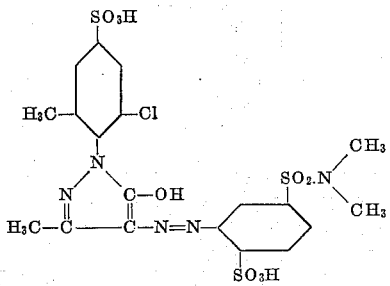

being a yellow powder which yields on wool greenish-yellow dyeings of good fastness to light, water and washing.

4. The water-soluble azo dyestuff of the following formula:

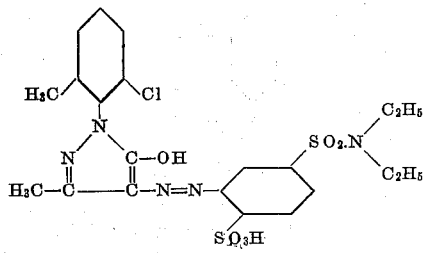

being a yellow powder which yields on wool yellow dyeings of very good fastness to light.

5. The water-soluble azo dyestuff of the following formula:

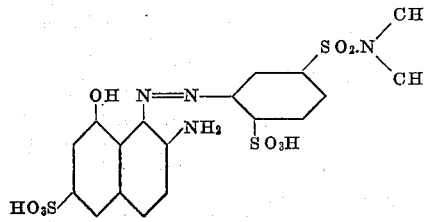

being a red powder which yields on wool red tints of very good fastness to light.

ERICH FISCHER.
OTTO LANG.
ARTHUR SIEBERT.